US010690163B2

United States Patent
Hardegen

(10) Patent No.: US 10,690,163 B2
(45) Date of Patent: Jun. 23, 2020

(54) FASTENER

(71) Applicant: Glabete GmbH, Ebersbach (DE)

(72) Inventor: Markus Hardegen, Esslingen (DE)

(73) Assignee: Glabete GmbH, Ebersbach (DE)

( * ) Notice: Subject to any disclaimer, the term of this patent is extended or adjusted under 35 U.S.C. 154(b) by 275 days.

(21) Appl. No.: 15/473,650

(22) Filed: Mar. 30, 2017

(65) Prior Publication Data
US 2017/0284439 A1  Oct. 5, 2017

(30) Foreign Application Priority Data
Mar. 30, 2016  (EP) ..................... 16162736

(51) Int. Cl.
*F16B 11/00* (2006.01)
*F16B 47/00* (2006.01)

(52) U.S. Cl.
CPC .......... *F16B 11/006* (2013.01); *F16B 47/003* (2013.01)

(58) Field of Classification Search
CPC ........ F16B 47/00; F16B 47/003; F16B 11/00; F16B 11/006; F16B 37/048; F16B 37/04; F16C 11/04; Y10T 403/32114; Y10T 403/47; Y10T 24/33; Y10T 403/473; B29C 65/484; B29C 65/54
USPC ......................................... 411/82
See application file for complete search history.

(56) References Cited

U.S. PATENT DOCUMENTS

| | | | | |
|---|---|---|---|---|
| 276,164 A | * | 4/1883 | Donahue | B42F 1/02 24/67 R |
| 2,092,341 A | * | 9/1937 | De Vries | F16B 13/143 52/704 |
| 3,239,178 A | * | 3/1966 | Pompa | F16B 47/003 211/1 |
| 4,551,189 A | * | 11/1985 | Peterson | B29C 65/0672 156/73.5 |
| 5,065,489 A | * | 11/1991 | Mullen | B23Q 1/0063 29/281.5 |
| 5,188,030 A | * | 2/1993 | Puschnerat | B41N 7/00 101/348 |
| 5,593,120 A | * | 1/1997 | Hamerski | B29C 65/0672 156/235 |
| 7,207,543 B2 | * | 4/2007 | Ortwein | F16B 11/006 156/578 |
| 7,815,496 B2 | * | 10/2010 | Lim | B24D 18/0063 451/526 |
| 7,833,620 B2 | * | 11/2010 | Enserink | F16B 47/003 248/205.3 |
| 8,318,278 B2 | * | 11/2012 | Arnal | B29C 66/21 156/247 |

(Continued)

FOREIGN PATENT DOCUMENTS

EP    2154384 A1 *  2/2010  ............ F16B 11/006
WO   WO-2012084476 A1 *  6/2012  ............ F16B 11/006

Primary Examiner — Josh Skroupa
(74) Attorney, Agent, or Firm — Michael Soderman

(57) ABSTRACT

A fastener (1) with a main body (2) whose external surfaces, with the exception of a fastening side (3) that serves to effect fastening to an object, are sealed up in a diffusion-proof way. The main body (2) has a discrete arrangement of reservoirs (6) opening out to the fastening side (3) that have a filler (7, 7a, 7b) with a hydrophilic material and/or moisture. An aerobic adhesive can be applied to the fastening side (3); hardening of the aerobic adhesive is brought about by the filler (7, 7a, 7b).

18 Claims, 3 Drawing Sheets

(56) References Cited

U.S. PATENT DOCUMENTS

| | | | | |
|---|---|---|---|---|
| 8,545,647 B2* | 10/2013 | Ash | ............... | F16B 11/006 |
| | | | | 156/60 |
| 8,663,417 B2* | 3/2014 | Braun | ............... | F16B 11/006 |
| | | | | 156/273.7 |
| 8,888,938 B2* | 11/2014 | Ronner | ............... | C09J 9/00 |
| | | | | 156/307.3 |
| 9,441,659 B2* | 9/2016 | Ortwein | ............... | F16B 11/006 |
| 9,461,450 B2* | 10/2016 | Pratley | ............... | H02G 3/22 |
| 10,036,411 B2* | 7/2018 | Kluge | ............... | F16B 33/004 |
| 10,352,345 B2* | 7/2019 | Evans | | |
| 2010/0032093 A1* | 2/2010 | Braun | ............... | F16B 11/006 |
| | | | | 156/329 |
| 2011/0211906 A1* | 9/2011 | Pratley | ............... | H02G 3/22 |
| | | | | 403/270 |
| 2012/0205027 A1* | 8/2012 | Ronner | ............... | C09J 9/00 |
| | | | | 156/71 |
| 2013/0102502 A1* | 4/2013 | Yang | ............... | B01J 19/0046 |
| | | | | 506/40 |
| 2013/0272775 A1* | 10/2013 | Ortwein | ............... | F16B 11/006 |
| | | | | 403/66 |

* cited by examiner

FASTENER

CROSS REFERENCE TO RELATED APPLICATIONS

This application claims the priority of EP 16162736.9 filed on 2016 Mar. 30; this application is incorporated by reference herein in its entirety.

BACKGROUND

The invention relates to a fastener in accordance with the preamble of claim 1.

A fastener of that type is known from WO 2012/084476 A1. The fastener described there is comprised of a main body and a material pervious to gases and liquids that has means for accommodating an object and that can be fixed in place on a support surface via an adhesive. A hydrophilic insert, to which moisture is supplied in a metered fashion and to which an aerobic adhesive can be applied, is attached to the inner surface of the main body facing the support surface. The adhesive is encapsulated in a gas-tight and liquid-tight manner together with the hydrophilic insert in a hollow area that is enclosed by the support surface and the main body.

Objects can be securely attached to support surfaces with this fastener without constructional measures with screws or the like having to be implemented in the support surfaces or objects for this.

An essential aspect of the fastener is the interaction of the aerobic adhesive with the hydrophilic insert in the fastener. Because of the contact of the aerobic adhesive with the hydrophilic insert, which contains a metered level of moisture, the aerobic adhesive hardens without contact with the surrounding air being required for this.

An optimal hardening process is not achieved, however, due to the planar distribution of the moisture via the hydrophilic insert extending over the entire support surface, because the metered addition of moisture to the adhesive is only done in an inadequate way, causing its hardening in the overall volume to be made more difficult or prevented, which does not lead to satisfactory fastening forces.

SUMMARY

The invention relates to a fastener (1) with a main body (2) whose external surfaces, with the exception of a fastening side (3) that serves to effect fastening to an object, are sealed up in a diffusion-proof way. The main body (2) has a discrete arrangement of reservoirs (6) opening out to the fastening side (3) that have a filler (7, 7a, 7b) with a hydrophilic material and/or moisture. An aerobic adhesive can be applied to the fastening side (3); hardening of the aerobic adhesive is brought about by the filler (7, 7a, 7b).

DETAILED DESCRIPTION

The invention is based on the objective of designing a fastener of the type mentioned at the outset that is easy to handle and that can be used in a flexible way with a high level of functionality and functional reliability.

The elements of claim 1 are specified to solve this problem. Advantageous embodiments of the invention are described in the subordinate claims.

The fastener as per the invention has a main body whose external surfaces, with the exception of a fastening side that serves to effect fastening to an object, are sealed up in a diffusion-proof way. The main body has a discrete arrangement of reservoirs opening out to the fastening side that have a filler with a hydrophilic material and/or moisture. An aerobic adhesive can be applied to the fastening side; hardening of the aerobic adhesive is brought about by the filler.

The fastener as per the invention is a fastener that brings about an attachment to objects without constructional measures such as screw connections, for instance.

The aerobic adhesive on the fastening side of the fastener is then diffusion-proof, meaning encapsulated in a gas-tight and liquid-tight manner, when the fastener is put on the object to be secured in place. The hardening process of the aerobic adhesive therefore takes place independently of the ambient conditions, for instance the humidity of the surrounding air.

An essential aspect of the invention is that several reservoirs that are filled with a filler open out on the fastening side of the fastener. The filler is designed here in such a way that it promotes or accelerates the hardening process of the aerobic adhesive. In general, the filling can already be added in the manufacturing process of the fastener. Alternatively, the filling can also first be added when the fastener is used.

It is important in connection with this that the filler is not distributed over the entire surface of the fastening side. Rather, a discrete arrangement of reservoirs is provided that open out on the fastening side, meaning that the reservoirs are arranged at predetermined distances with respect to one another. The amount of filler that is required for the hardening is precisely supplied to the aerobic adhesive from these reservoirs, so the hardening process can uniformly take place throughout the overall volume of the adhesive layer; a very stable connection is obtained between the fastener and the object because of that. The controlled supply of filler to the aerobic adhesive is enabled based on the fact that an excess of filler is locally available in the reservoirs in each case. Filler is automatically supplied to the aerobic adhesive via the contact of the aerobic adhesive and the filler at the openings of the reservoirs; there is not just a metering of the supply of filler to the aerobic adhesive based on quantity, but also metering based on time because of the limited cross-sections and the limited number of reservoirs.

In accordance with an advantageous embodiment of the invention, the aerobic adhesive is comprised of silane polymers. Alternatively, polyurethane can also be used as the aerobic adhesive.

It is also advantageous when the hydrophilic material is comprised of cotton, a composite fiber material, a salt, a mineral or a resin.

The hydrophilic material can be in a solid, liquid or gel-type form.

Alternatively or additionally, the filler will contain moisture or moisture will be supplied to this filler.

The moisture is comprised here of water or isopropanol, which is in a liquid or gel form.

In general, the filler can also contain or comprise glycerin or propylene glycol.

In accordance with a first variant of the invention, a hydrophilic material containing moisture is stored in the reservoirs as a filler.

In particular, the filler is pressed into the reservoirs.

In this case, the filler that is stored in the reservoir has to already react with the aerobic adhesive in such a way that it can cure without the addition of further materials. Consequently, the aerobic adhesive only has to be applied to the fastening side of the fastener and put on the object to attach the fastener. The filler can contain minerals as the hydrophilic material, for instance, to which water or isopropanol are added as moisture.

In accordance with a second variant of the invention, a hydrophilic material is stored in the reservoir that does not contain any moisture. Moisture is subsequently supplied to the hydrophilic material.

In particular, the hydrophilic material is pressed into the reservoirs.

In this case, the hydrophilic material is made in such a way that it cannot yet react with the aerobic adhesive on its own so that it can cure. Examples of this are salts and minerals that have been completely deprived of moisture. A mixture of hydrophilic material and moisture that can react with the aerobic adhesive first arises with the addition of moisture such as water or isopropanol. To attach the fastener, moisture is therefore first added to the hydrophilic material stored in the reservoirs in this variant and it is then applied to the aerobic adhesive on the fastening side.

In accordance with a third variant of the invention, a hydrophilic material is put into storage in the reservoir, especially by pressing it in, as a filler that heats up in contact with moisture.

In particular, the hydrophilic material comprises a zeolite.

In this case, the hydrophilic material, which is especially comprised of zeolite powder, is put into storage in the reservoirs without moisture content. Moisture, especially water, is added to the hydrophilic material before the aerobic adhesive is applied to the fastening side. After that, the hydrophilic material heats up. The reaction of the hydrophilic material with the subsequently applied aerobic adhesive is accelerated because of this generation of heat; the curing time of the aerobic adhesive is shortened because of that.

A salt with appropriate characteristics can also be used instead of a zeolite.

In accordance with a fourth variant of the invention, the reservoirs of the fastener are empty at first and are filled before use of the fastener with moisture, especially water.

In accordance with an embodiment of the invention with constructional advantages, the reservoirs comprise hollow cylindrical recesses in the main body.

An excess of filler can be locally accumulated in the reservoirs with this type of design, so there is a controlled supply of filler to the aerobic adhesive.

It is advantageous when the reservoirs have identical shapes.

Moreover, the reservoirs are distributed over the entire fastening side in an essentially uniform way.

These design measures ensure that the filler is supplied to the aerobic adhesive in a uniform way over the entire fastening side.

In accordance with an advantageous further development of the invention, an overflow channel that extends around the entire circumference of the fastening side is connected to the outer edge of the fastening side.

The outside of the overflow channel is bordered by an edge segment of the main body here that projects over the fastening side.

The overflow channel prevents the aerobic adhesive from overflowing the edge of the main body to its outer surface when the aerobic adhesive is applied to the fastening side.

As a further advantage, an adhesive agent is applied to the exposed face of the edge segment.

In particular, the adhesive agent is adhesive tape.

The adhesive agent constitutes a means for preliminarily fixing the fastener in place that securely holds the fastener on the object until the aerobic adhesive has hardened and takes over the permanent attachment of the fastener to the object.

In accordance with an advantageous embodiment of the invention, the fastener is an adapter that can be attached to an object.

As an example, the adapter can be attached to a wall of a room of a building, for instance a bathroom, that constitutes the object. Objects such as hinges or hooks or the like, which can in turn hold furnishings and the like, can then be attached to the adapter.

BRIEF DESCRIPTION OF THE DRAWINGS

The invention will be explained with the aid of the drawings below. The following are shown in the figures.

DETAILED DESCRIPTION OF THE PREFERRED EMBODIMENTS

Figure 1:
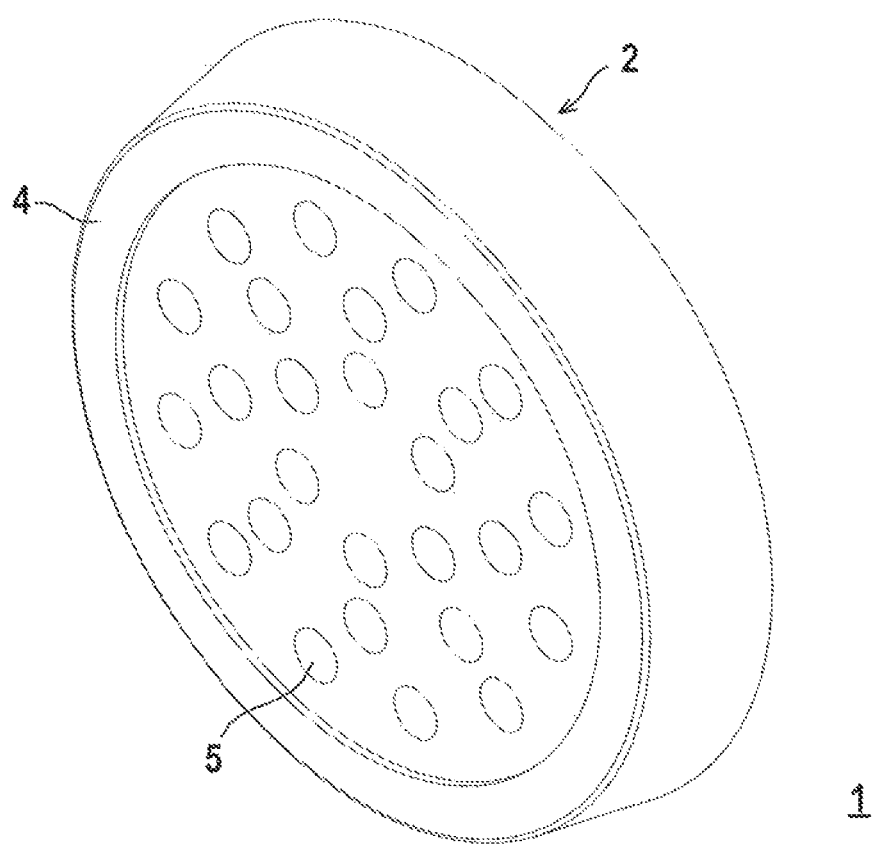
FIG. 1: First example of the fastener as per the invention.

FIG. 1 shows a first example of a fastener 1 that can, in particular, be designed as an adapter. The fastener 1 has a main body 2 comprised of a diffusion-proof material, meaning a material that is impervious to gas an liquid. The main body 2 is comprised of a metallic material, for instance aluminum, a zinc die-cast or a plastic.

The main body 2 has a circular cross-section; its base surface and its external surface are completely closed, diffusion-proof surfaces. The side of the main body 2 opposite the base surface forms a fastening side 3 with which the fastener 1 is attached to an object, for instance a wall of a building. The fastening side 3 forms a flat surface that is essentially circular. The upper edge of the cylindrical outer wall forms an edge segment 4 that slightly projects over the fastening side 3. The top of the edge segment 4 forms a flat support surface with which the fastener 1 can be placed on the object.

As FIG. 1 shows, the fastening side 3 is interspersed with a discrete arrangement of openings 5 that are essentially uniform, meaning that they are distributed at essentially equal distances to each other over the entire fastening side 3. The openings 5 constitute the outlets of reservoirs 6 that are shown in FIGS. 2 to 4.

The reservoirs 6 constitute hollow cylindrical recesses, in this case circular cylindrical recesses, in the main body 2. The reservoirs 6 of the main body 2 have identical designs in each case. The lengths of the reservoirs 6 run perpendicular to the fastening side 3 here.

As shown in FIGS. 2 to 4 for various variants of the invention, a filler 7, 7*a*, 7*b* is put into storage in the reservoirs 6. If an aerobic adhesive is applied to the fastening side 3 for fastening, the aerobic adhesive comes into contact with the filler 7, 7*a*, 7*b* that has been put into storage in the reservoirs 6. The filler 7, 7*a*, 7*b* promotes and accelerates the hardening process of the aerobic adhesive, so the aerobic adhesive cures in its entire volume. The aerobic adhesive is applied to the fastening side 3 in such a way that it forms a layer that does not, or does not significantly, project over the edge segment 4 of the main body 2. The fastener 1 with the layer of aerobic adhesive applied to the fastening side 3 is then placed on the object. The adhesive layer 8 is therefore encapsulated in a diffusion-proof way with respect to the surroundings, so the hardening process is independent of external ambient influences.

The aerobic adhesive is preferably comprised of a silane polymer, especially a silane MS polymer or polyurethane.

The filler 7, 7*a*, 7*b* is comprised of at least one hydrophilic material and/or moisture.

It is advantageous when the hydrophilic material is comprised of cotton, a composite fiber material, a salt, a mineral or a resin.

Furthermore, the moisture is comprised of water or isopropanol, which is in a liquid or gel form.

Figure 2A:
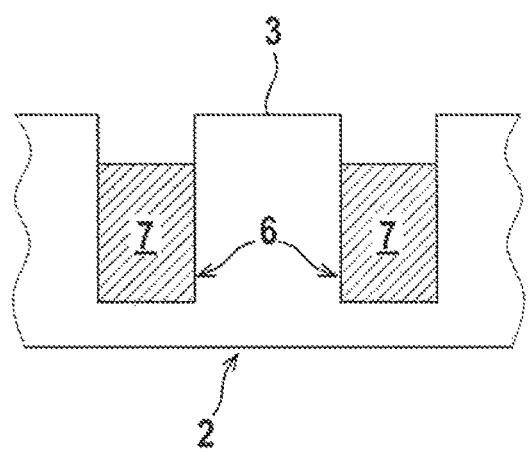
FIG. 2A: Partial representation of the fastener in accordance with FIG. 1 in a longitudinal section with a first filler in the reservoir of the fastener before the application of aerobic adhesive to the fastening side of the fastener.
Figure 2B:
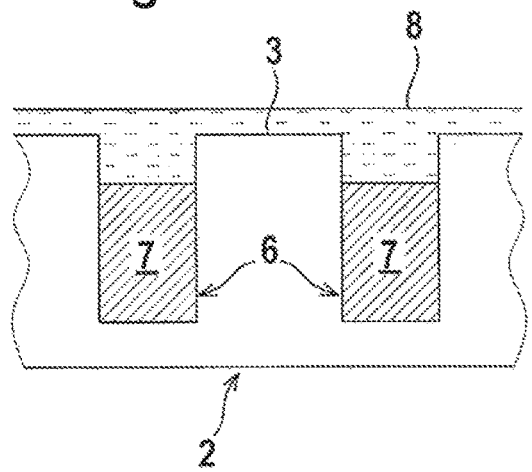
FIG. 2B: The fastener of 2A after the application of aerobic adhesive to the fastening side of the fastener.

FIGS. 2*a* and 2*b* show a first variant of the invention. In the arrangement of FIG. 2*a*, a hydrophilic material, to which moisture is supplied, is put into storage in all of the reservoirs 6 as a filler 7*a*. A salt or a mineral is provided as a hydrophilic material, as an example, to which water is added as the moisture. The filler 7*a* that is formed in this way can be pressed into the reservoirs 6, in particular, so that it is stored so as not to be lost in the main body The hydrophilic material containing moisture forms a filler 7*b* that can directly react with the aerobic adhesive so that it will harden. If, as shown in FIG. 2*b*, the aerobic adhesive is applied to the fastening side 3 in the form of an adhesive layer 8, the aerobic adhesive will penetrate into the reservoir 6 and come in contact with the filler 7*b*. If the arrangement formed in this way is applied to the object, moisture is transported from the filler 7*b* to the adhesive layer, so the aerobic adhesive can cure in its entire volume.

Figure 3A:
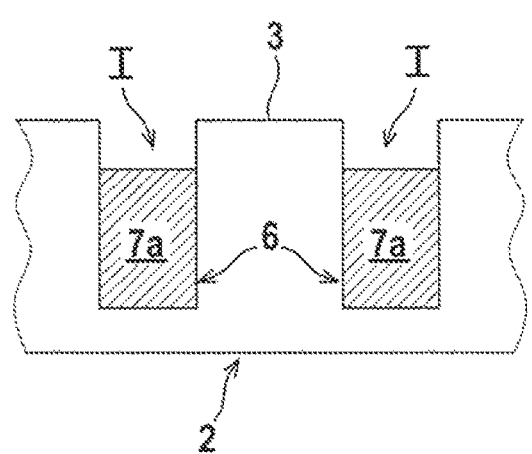
FIG. 3A: Partial representation of the fastener in accordance with FIG. 1 in a longitudinal section with a second filler in the reservoir of the fastener before the application of aerobic adhesive to the fastening side of the fastener.
Figure 3B:
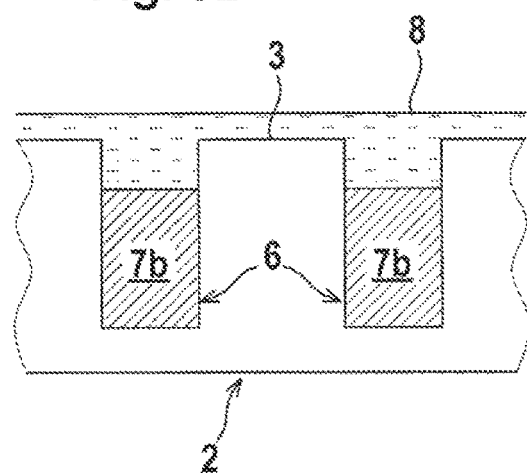
FIG. 3B: The fastener of 3A after the application of aerobic adhesive to the fastening side of the fastener.

FIGS. 3*a* and 3*b* show a second variant of the invention. As FIG. 3 shows, a filler 7*a* that does not contain moisture is contained in all of the reservoirs 6. As shown with the arrow designated I in FIG. 3*a*, moisture, for instance water or isopropanol, is subsequently added to the filler 7*a* in the reservoirs 6. A hydrophilic material containing moisture is therefore obtained as a filler 7*b* (FIG. 3*b*). After that, an adhesive layer 8 is applied to the fastening side 3, so the aerobic adhesive comes into contact with the filler 7*b* in the form of a hydrophilic material containing moisture, so the aerobic adhesive can cure.

Figure 4A:
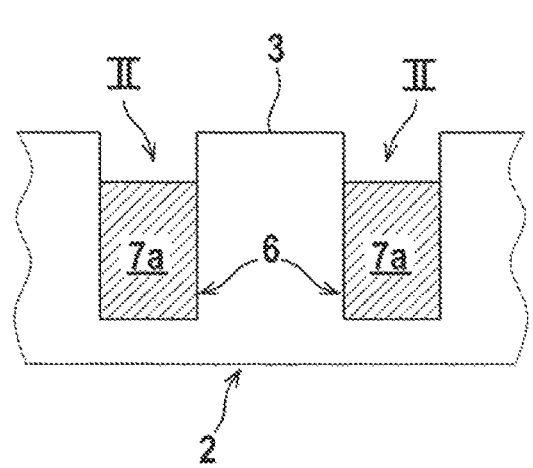
FIG. 4A: Partial representation of the fastener in accordance with FIG. 1 in a longitudinal section with a third filler in the reservoir of the fastener before the application of aerobic adhesive to the fastening side of the fastener.
Figure 4B:
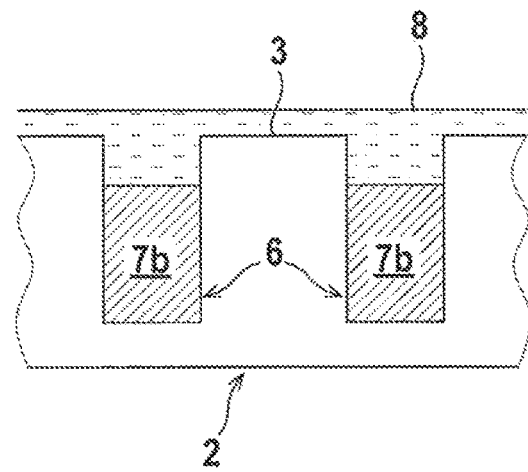
FIG. 4B: The fastener of 4A after the application of aerobic adhesive to the fastening side of the fastener.

FIGS. 4*a* and 4*b* show a third variant of the invention. In accordance with the embodiment of FIGS. 3*a* and 3*b*, a hydrophilic material that does not contain moisture is put into storage in the reservoirs 6, in particular pressed in, as a filler 7*a*. In this case, the hydrophilic material is comprised of a material that heats up when moisture is added. It is advantageous when the filler 7*a* is comprised of a zeolite powder.

In this embodiment, moisture is added once again to the filler 7*a* (Arrow II in FIG. 4*a*) and an adhesive layer 8 is applied right after that (FIG. 4*b*). The generation of heat in the filler 7*b* brought about by the addition of moisture accelerates the hardening process of the aerobic adhesive.

Figure 5:
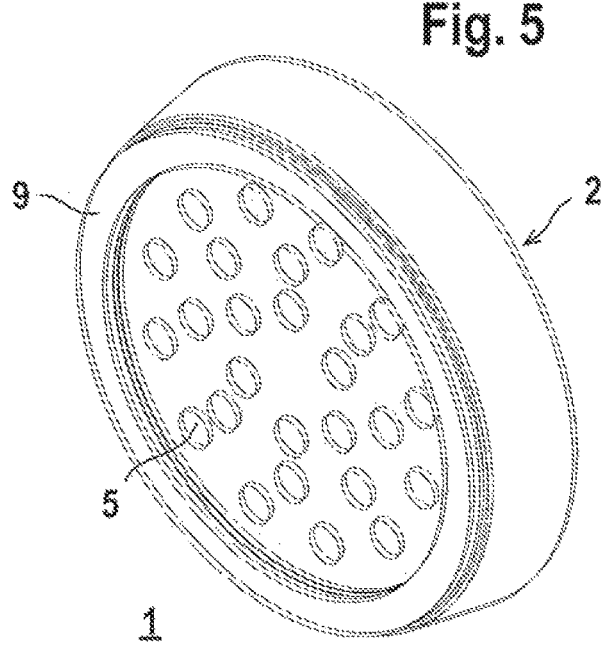
FIG. 5: Second example of the fastener as per the invention.

FIG. 5 shows a further embodiment of the fastener 1. This fastener 1 only differs from the embodiment of FIG. 1 in that an adhesive agent in the form of a double-sided adhesive tape 9 is applied to the support surface of the edge segment 4 of the main body 2 projecting over the fastening side 3. The adhesive tape 9 serves as a means for preliminarily fixed the fastener 1 in place on the object.

Figure 6:
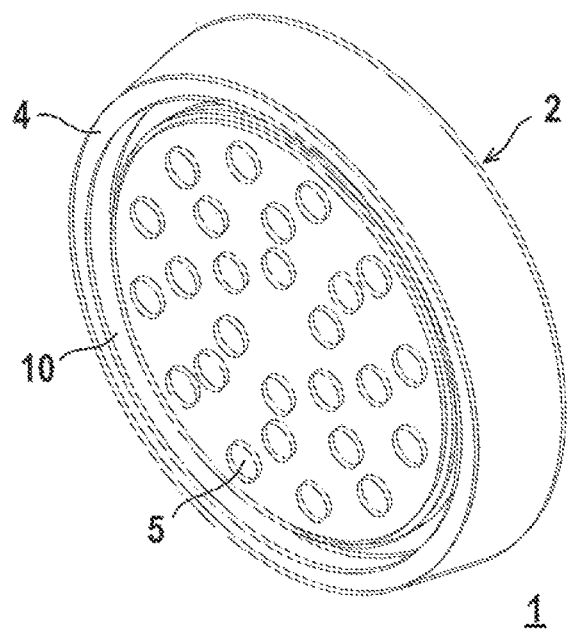
FIG. 6: Third example of the fastener as per the invention.

FIG. 6 shows a further embodiment of the fastener 1. This fastener 1 only differs from the embodiment of FIG. 1 in that an overflow channel 10 is provided between the edge of the fastening side 3 and the edge segment 4 of the main body 2. The overflow channel 10 forms a deepened area that extends with a constant cross-section over the entire circumference of the fastening side 3. The overflow channel 10 prevents an overflow of the aerobic adhesive over the edge segment 4 when the aerobic adhesive is applied to the fastening side 3.

Figure 7:
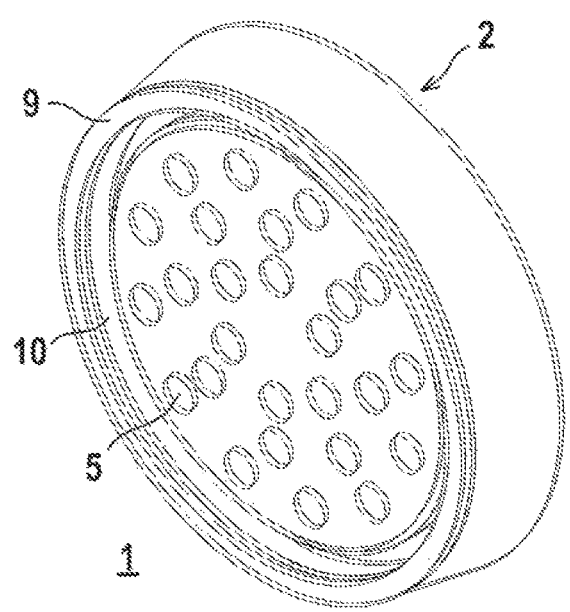
FIG. 7: Fourth example of the fastener as per the invention.

The embodiment of the fastener 1 in accordance with FIG. 7 represents a combination of the embodiments of FIGS. 5 and 6, meaning that the fastener 1 in accordance with FIG. 7 has both adhesive tape 9 on the edge segment 4 of the main body 2 and an overflow channel 10.

LIST OF REFERENCE NUMERALS (1) Fastener
(2) Main body
(3) Fastening side
(4) Edge segment
(5) Opening
(6) Reservoir
(7) Filler with moisture
(7*a*) Filler without moisture
(7*b*) Filler without moisture
(8) Adhesive layer
(9) Adhesive tape
(10) Overflow channel

The invention claimed is:

1. A fastener with a main body (2),
external surfaces of said main body being sealed up so as to be diffusion proof, with the exception of a fastening side (3) of the main body that serves to effect fastening to an object,
characterized in that the main body (2) has a discrete arrangement of reservoirs (6) opening out to the fastening side (3),
wherein a filler (7, 7*a*, 7*b*) with a hydrophilic material and/or moisture is exclusively available in the reservoirs,
and wherein an aerobic adhesive is provided that is exclusively applied as an adhesive layer to the fastening side (3),
wherein curing of the aerobic adhesive is brought about by the filler (7, 7*a*, 7*b*),
and wherein there is not just a metering of the supply of filler based on quantity,
but also metering based on time because of limited cross-sections and a limited number of reservoirs,
so the hardening process can uniformly take place throughout the overall volume of the adhesive layer.

2. The fastener according to claim 1, characterized in that the aerobic adhesive is comprised of silane polymers or of polyurethane.

3. The fastener according to claim 1, characterized in that the hydrophilic material comprises cotton, a composite fiber material, a salt, a mineral or a resin.

4. The fastener according to claim 1, characterized in that the filler (7, 7a, 7b) contains moisture or that moisture is supplied to the filler (7, 7a, 7b).

5. The fastener according to claim 4, characterized in that the moisture is comprised of water or isopropanol that is in a liquid form or a gel form.

6. The fastener according to claim 1, characterized in that hydrophilic material containing moisture is stored in the reservoirs (6) as the filler (7, 7a, 7b).

7. The fastener according to claim 6, characterized in that the filler (7, 7a, 7b) is pressed into the reservoirs (6).

8. The fastener according to claim 1, characterized in that the hydrophilic material not containing moisture has been put into storage in the reservoirs (6) and that moisture is subsequently supplied to the hydrophilic material.

9. The fastener according to claim 8, characterized in that the hydrophilic material is pressed into the reservoirs (6).

10. The fastener according to claim 1, characterized in that the hydrophilic material is put into storage in the reservoirs (6) as filler (7, 7a, 7b) that heats up when in contact with moisture.

11. The fastener according to claim 10, characterized in that the hydrophilic material is comprised of a zeolite.

12. The fastener according to claim 1, characterized in that the reservoirs (6) are comprised of hollow cylindrical recesses in the main body (2).

13. The fastener according to claim 1, characterized in that the reservoirs (6) have identical shapes.

14. The fastener according to claim 13, characterized in that the overflow channel (10) is bordered outside by an edge segment (4) of the main body (2) that projects over the fastening side (3).

15. The fastener according to claim 1, characterized in that an overflow channel (10) that extends around the entire circumference of the fastening side (3) is connected to the outer edge of the fastening side (3).

16. The fastener according to claim 15, characterized in that an adhesive agent is applied to the exposed face of the edge segment (4).

17. The fastener according to claim 16, characterized in that the adhesive agent is adhesive tape (9).

18. The fastener according to claim 1, characterized in that the fastener is an adapter to which the object is attached.

* * * * *